(12) United States Patent
Di Mario

(10) Patent No.: US 8,326,681 B2
(45) Date of Patent: Dec. 4, 2012

(54) DETERMINING PERFORMANCE PROFICIENCY WITHIN AN ORGANIZATION

(76) Inventor: Peter E. Di Mario, Bellevue, WA (US)

( * ) Notice: Subject to any disclaimer, the term of this patent is extended or adjusted under 35 U.S.C. 154(b) by 1687 days.

(21) Appl. No.: 11/389,394

(22) Filed: Mar. 24, 2006

(65) Prior Publication Data

US 2007/0226050 A1    Sep. 27, 2007

(51) Int. Cl.
*G06Q 10/00* (2012.01)
(52) U.S. Cl. ....................... 705/7.42
(58) Field of Classification Search ............ 705/7.42
See application file for complete search history.

(56) References Cited

U.S. PATENT DOCUMENTS

| | | | | |
|---|---|---|---|---|
| 5,926,794 | A * | 7/1999 | Fethe | 705/7.39 |
| 6,119,097 | A * | 9/2000 | Ibarra | 705/11 |
| 6,249,715 | B1 * | 6/2001 | Yuri et al. | 700/111 |
| 7,483,843 | B2 * | 1/2009 | Honda et al. | 705/7.37 |
| 2002/0161664 | A1 * | 10/2002 | Shaya et al. | 705/26 |
| 2006/0149764 | A1 * | 7/2006 | Burchfield et al. | 707/101 |
| 2006/0203991 | A1 * | 9/2006 | Kramer et al. | 379/265.06 |
| 2007/0203713 | A1 * | 8/2007 | Habichler et al. | 705/1 |

OTHER PUBLICATIONS

Gautrea, Andrew et al., Recent Trends in Performance Measurement Systems—The Balanced Scorecard Approach Management Research News, 2001, vol. 24, Issue 3/4, pp. 153-156.*

Meyer, Gary, 360 on the Net: A computer toolkit for multirater performance feedback HR Magazine, Oct. 1998; vol. 43, Issue 11, pp. 46-50.*

* cited by examiner

*Primary Examiner* — Jonathan G Sterrett
*Assistant Examiner* — Luis Santiago

(57) ABSTRACT

Described are methods and mechanisms for determining performance proficiency within an organization. The method includes receiving rating data that includes one or more values that are each associated with an element and each element describes a specific rating criterion associated with a specific rating subject. The method additionally includes producing a hierarchical data structure responsive to the receipt of the rating data that includes at least one category and each category includes at least one factor having at least one element. The method further includes generating a rating schema based on the hierarchical data structure. The method may additionally include providing the rating schema to a client and the value within each element may define an ability of a rating subject. Each value associated with an element may be a numerical value.

14 Claims, 6 Drawing Sheets

DETERMINING PERFORMANCE PROFICIENCY WITHIN AN ORGANIZATION

BACKGROUND OF THE INVENTION

The invention relates generally to the field of performance evaluation, and more particularly to a performance proficiency and effectiveness schema.

A corporate organization can not expect to consistently achieve its revenue growth plan and have a uniform way to succeed against competition unless it has the right and most proficient human capital (e.g., employees) in its delivery and execution channels. A company's business and product strategies typically fail because of a lack of ability to execute in a way that delivers planned results. This flaw centers around retaining human capital in the wrong positions as well as sustaining an ineffective team to deliver critical business and product strategies.

The amount of time and financial and human resources that are required at the senior management level to develop product and company strategies is enormous. When a corporation then witnesses flawed field and operation forecasts as well as failed execution of these strategies, the loss of time and resources is immeasurable. Because of these execution shortfalls, the internal financial overtones are enormous. The external financial implications typically manifest themselves as a reduction in earnings per share (EPS) and market confidence, which drives down stock price and the precious equity that generates cash.

Today, the financial impact of these defects in managing human capital at the field and operation level is of utmost concern to senior management of any serious company. Additionally, in a few companies managing human capital is being recognized as a required strategic initiative to enhance the human asset's effectiveness to be able to proficiently and profitably execute the company's business and service to customer strategies.

An adequate system for determining performance proficiency within an organization has eluded those skilled in the art, until now.

SUMMARY OF THE INVENTION

The invention is directed to determining performance proficiency within an organization. In one aspect, a method for arranging data within a performance rating schema includes: receiving rating data, the rating data including one or more values each associated with an element, each element describing a specific rating criterion associated with a specific rating subject; producing a hierarchical data structure responsive to the receipt of the rating data, the hierarchical data structure including at least one category, each category including at least one factor, each factor including at least one element; and generating a rating schema based on the hierarchical data structure.

In another aspect, a data structure includes: a job proficiency category field, the job proficiency category field including at least one factor having a value that rates an individual's job proficiency; a job performance category field, the job performance category field including at least one factor having a value that rates the individual's job performance; and a job effectiveness category field, the job effectiveness category field including at least one factor having a value that rates the individual's job effectiveness.

In yet another aspect, a system for providing a rating schema based on a hierarchical data structure includes: element means for rating a particular individual regarding one or more specific rating criterion; factor means for organizing the element means; category means for organizing the factor means; means for producing a hierarchical data structure based on the category means, the factor means, and the element means; and means for generating a rating schema based on the hierarchical data structure.

DETAILED DESCRIPTION

What follows is a detailed description of various techniques and mechanisms for determining performance proficiency within an organization. Very generally stated, the present invention is directed at analyzing the performance proficiency of members of an organization.

The invention may be embodied in computer-automated implementations, or it may be embodied in manually-prepared implementations. The scope of the invention is envisioned to encompass both. Accordingly, this patent document will begin by describing a computer environment in which the invention could be implemented, and will follow with a discussion of the particulars of the inventive analytical framework.

Figure 1:
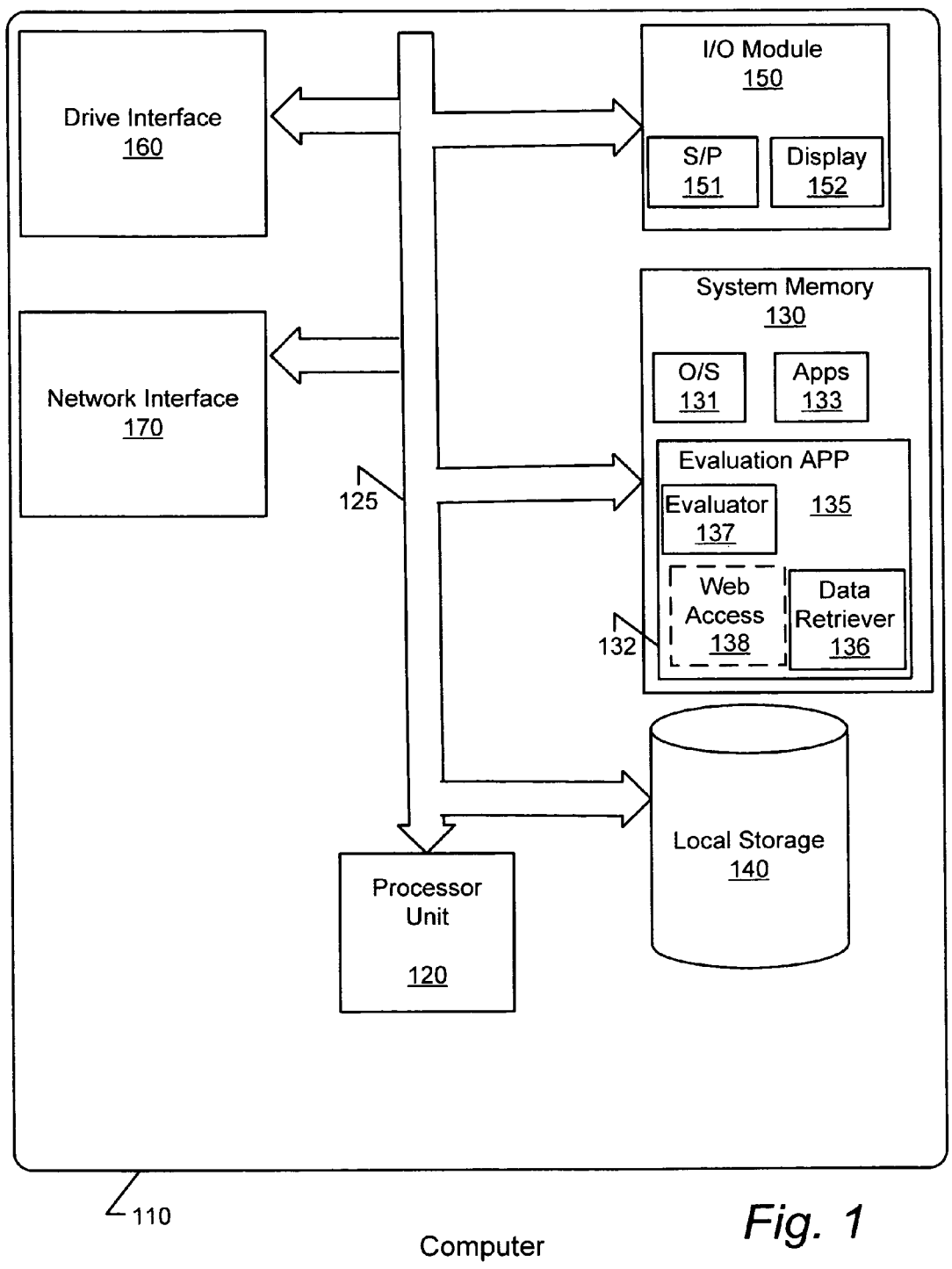
FIG. 1 is a functional block diagram generally illustrating a computing device that may be used to implement certain embodiments of the invention.

FIG. 1 is a functional block diagram generally illustrating a sample computing device 110 that may be used in particular implementations of the invention. The computing device 110 may be any computing device, such as a personal computer (PC), a laptop, a server computer, desktop computers, handheld computers, minicomputers, mainframe computers, and the like. The invention may also be practiced in distributed computing environments where certain tasks are performed by remote processing devices linked through a communications network. In a distributed computing environment, program modules may be located in both local and remote memory storage devices. Computing device 110 may include additional components not relevant to the present discussion.

The computing device 110 includes a processing unit 120, a system memory 130, and a system bus 125 that couples various system components including the system memory 130 to the processing unit 120. The system bus 125 may be any of several types of bus structures or combinations of several types of bus structures including a memory bus or memory controller, a peripheral bus, and a local bus using any of a variety of bus architectures, such as Integrated Drive Electronics (IDE) that is also known as Advanced Technology Attachment (ATA), Serial ATA (SATA), Ultra-ATA (UATA), Small Computer System Interface (SCSI), Serial Attached SCSI (SAS), and the like. The system memory 130 includes read-only memory (ROM) and random access memory (RAM). A basic input/output system (BIOS), containing the basic routines that help to transfer information between elements within the computing device 110, such as during start-up, is stored in the ROM (not shown).

The computing device 110 may further include local storage 140, such as a hard disk drive for reading from and writing to a hard disk (not shown), a magnetic disk drive (not shown) for reading from or writing to a removable magnetic disk (not shown), and an optical disk drive (not shown) for reading from or writing to a removable optical disk (not shown) such as a CD-ROM or other optical media. The drives and their associated computer-readable media provide non-volatile storage of computer-readable instructions, data structures, program modules and other data for the computing device 110.

Although the exemplary computer system describes the employment of a hard disk, a removable magnetic disk, and a removable optical disk, it should be appreciated by those skilled in the art that other types of computer-readable media which can store data that is accessible by a computer, such as magnetic cassettes, flash memory cards, digital video disks, random access memories (RAMs), read-only memories (ROMs) and the like may also be used in the exemplary computing device.

A user may enter commands and information into the computing device 110 through input devices such as a keyboard and pointing device. Other input devices (not shown) may include a microphone, joystick, game pad, satellite dish, scanner or the like. These and other input devices are often connected to the processing unit 120 through input/output (I/O) module interface 150 that is coupled to system bus 125 and that may include one or more additional specific interfaces, such as serial port interface 151, a parallel port (not shown), game port (not shown) or universal serial bus (USB) (not shown). A monitor (not shown) or other type of display device is also connected to the system bus 125 via an interface, such as video adapter 152. In addition to the monitor, computing devices typically include other peripheral output devices, such as an auxiliary display or speakers and printers (not shown). An auxiliary display is an additional output device connected to the system bus 125 via an auxiliary display interface, which may be a video adaptor, USB or other peripheral device connection. The input device for controlling the auxiliary display is connected to system bus 125 via I/O module interface 150, which may be a serial interface, USB or other peripheral device connection.

A number of program modules may be stored on the local storage 140 and executed in system memory 130, including an operating system 131, one or more other application programs 132, other program modules and program data, such as evaluation application 135.

In accordance with one implementation of the invention, evaluation application 135 is a software component for determining performance proficiency within an organization and includes a data retriever 136 and an evaluator 137. The data retriever 136 locates and retrieves rating data, and evaluator 137 evaluates the retrieved data. Evaluation application 135 may optionally include web access 138 that provides additional functionality to allow evaluation application 135 to receive rating data to computing device 110 via the internet.

The computing device 110 may operate in a networked environment (described in FIG. 2, below) using logical connections to one or more remote computers (described in FIG. 2, below). The remote computer may be another personal computer, a server, a router, a network PC, a peer device or other common network node, and typically includes many or all of the elements described above relative to the computing device 110. Such networking environments are commonplace in offices, enterprise-wide computer networks, Intranets and the Internet. When used in a LAN networking environment, the computing device 110 is connected to the local network through a network interface or adapter. When used in a WAN networking environment, the computing device 110 typically includes a modem or other means for establishing communications over the wide area network, such as the Internet. In one embodiment, the modem, which may be internal or external, is connected to the system bus 125 via the serial port interface within I/O module interface 150.

In a networked environment (described in FIG. 2, below), program modules depicted relative to computing device 110, or portions thereof, may be stored in the remote memory storage device. It will be appreciated that the network connections shown are exemplary and other means of establishing a communications link between the computers may be used.

Figure 2:
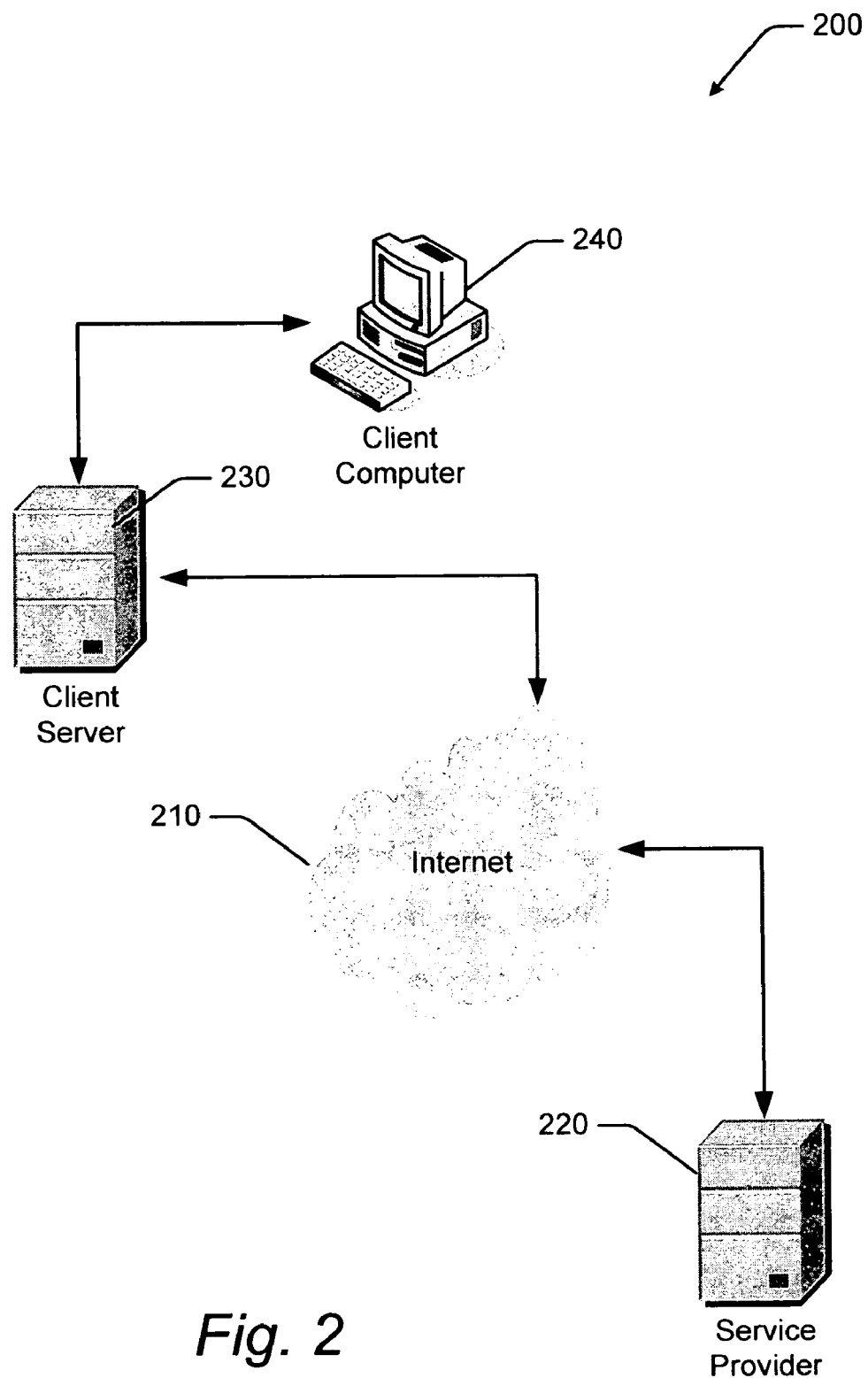
FIG. 2 is a functional block diagram generally illustrating a networked environment in which other embodiments of the invention may be implemented.

FIG. 2 is a functional block diagram generally illustrating a sample networked environment 200 that may be used in particular implementations of the invention. The network environment 200 may be any network, such as a combination of interconnected networks (e.g., local area networks, wide area networks, and the like) utilizing internet 210. Internet 210 is a global collection of networks connected together utilizing various methods to form a single entity. In one embodiment, the internet consists of several backbones connecting various geographical regions utilizing high-level networks connected to one another via network access points (NAPs). Within the NAPs are individual points of preference (POPs) that facilitate local users' access to the internet 210.

Networked environment 200 additionally includes service provider 220. Service provider 220 is configured to interact with other devices for some purpose. Service provider 220 may be a network of devices, such as one or more servers and associated peripherals, that provide requested services to users consistent with its devices, associated programming, and external requests for programming. In one embodiment, service provider 220 is implemented using one or more of the components described in FIG. 1, above. In one example, the service provider 220 maintains databases of transactional data. An example of transactional data includes information regarding ratings of individuals within a client's sales force as rated by management within the client's sales force (e.g., raters). The ratings that make up a portion of the transactional data can be provided locally or remotely (described below). In such an example, that client may desire to allow raters to update rating information stored at the service provider 220 as well as allow modified ratings based on the newly acquired information to be communicated to the client. Many other examples will become apparent to those in the industry. The service provider 220 shown in FIG. 2 may represent more than a single service provider, with each service provider being associated with different functionality or perhaps the plurality of service providers can be used for load balancing.

Networked environment 200 also includes remote server 230. Remote server 230 is also configured to interact with other devices for some purpose. Remote server 230 may be a network of devices, such as one or more servers and associated peripherals that provide requested services to users consistent with its devices, associated programming, and external requests for programming. In one embodiment, remote server 230 is implemented using one or more of the components described in FIG. 1, above. In one example, the remote server 230 may provide a conduit to service provider 220 allowing a client to access the databases of transactional data (described above). In such an example, that client may desire to allow raters utilizing remote server 230 to update rating information stored at the service provider 220 as well as allow modified ratings based on the newly acquired information to be communicated to the client via remote server 230. Many other examples will become apparent to those in the industry. The remote server 230 shown in FIG. 2 may represent a distributed server network, with each node of the network associated with one or more raters, such as raters in different geographic locations. Alternatively, the distributed server network may be implemented utilizing a plurality of server components for load balancing.

Networked environment 200 also includes client computer 240. Client computer 240 is configured to interact with other devices for some purpose. Client computer 240 is a computing device, such as a personal computer, a work station, a laptop, a personal digital assistant (PDA), or some such other device. Client computer 240 is in communication with remote server 230 and is further in communication with service provider 220 via internet 210. In one example, the client computer 240 may provide an access point to remote server 230 and thereby to service provider 220 allowing a client to access the databases of transactional data (described above). In such an example, that client may desire to allow raters utilizing client computer 240 and remote server 230 to update rating information stored at the service provider 220 as well as allow modified ratings based on the newly acquired information to be communicated to the client via client computer 240 and remote server 230. Many other examples will become apparent to those in the industry.

The client computer 240 shown in FIG. 2 may be implemented using one or more of the components described in FIG. 1, above. In one example, multiple client computers 240 (additional client computers not shown) may represent one or more nodes within a centralized computing network, such as a centralized remote server 230. In this example, each client computer 240 may represent one or more raters, such as multiple raters in the same geographic location with each rater having her own client computer 240 to access service provider 220 via internet 210. In another example, multiple client computers 240 (additional client computers not shown) may represent one or more nodes within a distributed server network, with each node of the network associated with one or more raters, such as raters in different geographic locations with each rater having her own client computer 240 to access service provider 220 via internet 210.

Figure 3:
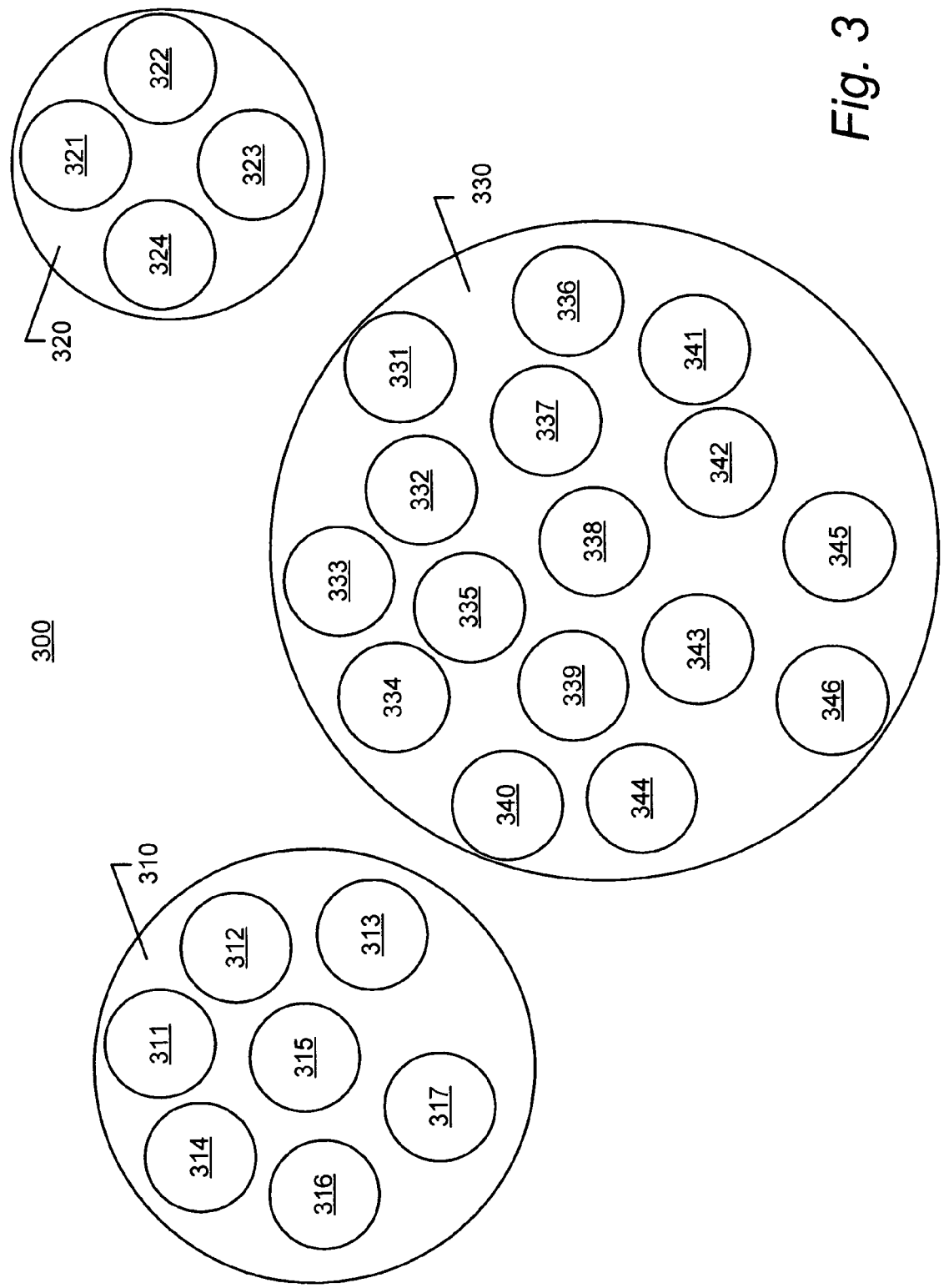
FIG. 3 is a conceptual illustration of organization criteria for performing a rating analysis, in accordance with one embodiment of the present invention.

FIG. 3 is a conceptual illustration 300 of organization criteria used to perform a performance rating analysis, in accordance with one embodiment of the present invention. Conceptually speaking, hierarchical diagram 300 includes three categories 310, 320, and 330 that are data constructs each describing a work related area having sub-areas to be rated. In another embodiment, there may be more categories or fewer categories. In an example, the work related area represented by category 310 is job proficiency. In another example, the work related area represented by category 320 is job performance. In yet another example, the work related area represented by category 330 is job effectiveness.

Each category in the hierarchy 300 additionally includes one or more factors 311-317, 321-324, and 331-346. Each factor is a data construct describing a work related sub-area associated with its parent category and further including a set of elements to be rated. In other words, each factor (311-317, 321-324, and 331-346) is made up of one or more elements that correspond to particular core competencies within each work related area. Each element may be a data point describing a specific work related competency to be rated. In one embodiment, the number or categories, factors, and elements within hierarchical diagram 300 may be greater than, less than, or provided in some alternative combination to the examples described herein. In another embodiment, hierarchical diagram 300 includes a set number of categories (e.g., three) that each includes a set number of factors (e.g., nine) having a set number of elements (e.g., three).

In an example and described above, hierarchical diagram 300 includes job proficiency category 310, job performance category 320, and job effectiveness category 330. In this example, job proficiency category 310 includes sales competence factor 311, communication factor 312, adept presentation factor 313, organizational dexterity factor 314, time management proficiency factor 315, prospect qualification factor 316, and customer workflow proficiency factor 317. As described above, each factor includes one or more elements describing a specific work related competency to be rated thereby providing an associated number of data points. In this example, sales competence factor 311 includes three elements including: proficiency in determining the mathematical requirements for various types of prospect levels necessary to achieve designated revenue/margin budgets as well as skills in maintaining assigned prospect levels on a month and year to date basis; the ability to secure sufficient orders of a specific type, revenue, and value to consistently achieve the account manager's revenue, margin and order budgets on a monthly and a year to date basis; and the capability to maximize the order/revenue potential of an account within his/her assignment and the skill to smooth the hills and valleys in monthly performance. In this example, communication factor 312 includes three elements including: the capability of being viewed as a business professional (e.g., not a sales person) that brings business value regardless of the client's position within the organization; skilled at applying his/her solution in a way that positively effects an account manager's contacts measurement criteria; and the ability to adequately convey his/her thoughts (e.g., verbal, non-verbal or written) to ensure the message is clearly understood and internalized while advancing and positioning the sales cycle towards his/her solutions.

In this example, adept presentation factor 313 includes three elements including: utilizes a formal vehicle (e.g., PowerPoint) that provides the criteria for the solution that is presented to the client's business owner; articulates the unique distinctions which leverage his/her solution and business value that are different from his/her competitor's and also advances his/her sales cycle to a close; and does presentation uncover any hidden issues and objections (e.g., business owner is an individual within a client's organization that owns the budget and is directly affected by the solution's success or failure).

In this example, organizational dexterity factor 314 includes a single element including: the ability to multi-task and manage the pre-determined critical factors for success (e.g., 90% attainment monthly is the minimum requirement) and the skill to navigate through his/her internal and external organization in a planned way to minimize the loss of customer face time.

In this example, time management proficiency factor 315 includes two elements including: the capability to maximize face time in front of the customer (e.g., a 65% week/month requirement) and effective time utilization that continually advances multiple sales through the sales cycle as well as the aptitude to continually focus on the key priorities and critical success factors that enhance margin/revenue; and the discipline to make a minimum number (e.g., six) of "good selling" calls per week (face to face) that create new prospects or advances prospects through the sales cycle while, at the same time, being able to meet the other predefined job responsibilities.

In this example, prospect qualification factor 316 includes three elements including: the capability of determining if the client has a need (known/unknown), desire, budget and defined timeline to purchase his/her company's solutions; being able to identify the key decision maker early in the sales cycle (e.g., within the first or second call); and the ability to gain a meeting with the key decision maker before the sales cycle is at a particular completion point (e.g., 40%) and the skill of garnering a "go, no-go" decision before the sales cycle reaches that completion point.

In this example, customer workflow proficiency factor 317 includes two elements including: comprehension of how products move through the warehouse as well as an understanding of the financial implications that occur when there are breaks and inefficiencies in the work flow process, as well as knowledge and ability to grasp the measurement criteria used to monitor success; and understanding of how products move through the manufacturing facility as well as the financial implications of breaks and inefficiencies in the work flow process, and an in depth understanding of supply chain management as it relates to raw materials received, products produced, and delivery to a company's customers.

Further to this example, job performance category 320 includes industry knowledge factor 321, product knowledge factor 322, customer knowledge factor 323, and client's customer business factor 324. As described above, each factor includes one or more elements describing a specific work related task to be rated thereby providing an associated number of data points.

In this example, industry knowledge factor 321 includes two elements including: a comprehension of the products and solutions that affect this particular market, knowledge and comprehension of enterprise networks and how the customer is being served by their network configuration, the ability to discuss how the solutions and applications of his/her company and the competition interface with the customer's current system, and the capability of articulating his/her business value to his/her vendors, manufacturers, and customers; and skilled in discussing workflow and its business and financial implications.

In this example, product knowledge factor 322 includes a single element including: a comprehension of the strengths and weaknesses of his/her product and the competition's offerings, and the knowledge and capability to position his/her solutions in a way that mitigates competition and produces planned margins/revenues.

In this example, customer knowledge factor 323 includes two elements including: the acumen and comprehension of an account manager's customer's business as it relates to the products the he/she produces, the markets he/she serves, his/her top five customers, and the business value he/she brings to their customers; and an understanding of his/her financials as it relates to the growth cycle he/she is currently experiencing (e.g., growing, flat, or declining).

In this example, client's customer business factor 324 includes a single element including: displays required knowledge and understanding of an account manager's client's customer's business and how the account manager affects his/her customer's revenues or provides financial efficiencies, and whether he/she is skilled in using this knowledge to create additional demand for his/her solutions.

Further to this example, job effectiveness category 330 includes consultative selling proficiency factor 331, effective client dialog factor 332, business knowledge factor 333, telephone aptitude factor 334, negotiation skills factor 335, prospecting expertise factor 336, new business demand creation factor 337, questioning techniques factor 338, objection handling adeptness factor 339, forecasting expertise factor 340, closing proficiency factor 341, account strategy acumen factor 342, territory/operation management factor 343, account penetration factor 344, trusted advisor factor 345, and executive level calls factor 346. As described above, each factor includes one or more elements describing a specific work related task to be rated thereby providing an associated number of data points.

In this example, consultative selling proficiency factor 331 includes three elements including: the ability to uncover root cause problems versus symptoms within a customer or potential customer's environment, the capability to position the business contact relationships within the account manager's prospect and customer base that will minimize the threat of competition; skilled at presenting viable solutions in a way that the decision maker and each member of the decision team feels political and business value is received; and is viewed by the client at prominent decision levels (e.g., 3×3 principle—up/down/across) as a trusted advisor that creates a win/win scenario where the account manager's planned margins are achieved and the client experiences the financial & political value of the solution.

In this example, effective client dialog factor 332 includes three elements including: the aptitude to garner proficient levels of credibility during the initial call with each contact as well as the contact's hierarchy (e.g., including two levels above the supervisor level), and the ability to understand each contact's as well as the contact's hierarchy's (e.g., supervisor and two levels above) critical success factors and how they are measured; and adeptness of an account manager to spend a proper amount of time (e.g., 80% of face/phone time) uncovering the salient points that affect the client's internal thought process that will influence the buying decision in the account manager's favor, for example if the account manager talks 20% and listens 80% of the time during every dialog.

In this example, business knowledge factor 333 includes two elements including: knowledge and understanding of the key functional areas and structure of a business (e.g., operations, merchandizing, sales, manufacturing, procurement, and the like), and proficiency in dissecting financial reports and their implications; and applying the aforementioned knowledge to the understanding of the management business topics, discussions and a comprehension of the business issues at the leadership level (director, VP, and the like).

In this example, telephone aptitude factor 334 includes a single element including: the skill to continually advance an opportunity through the sales cycle (e.g., thus saving valuable travel time) and the ability to create an appointment at the Director, VP, or higher without a lead (e.g., to make a "cold call").

In this example, negotiation skills factor 335 includes two elements including: the ability to negotiate a win/win agreement with the client that generates achievement of planned budget/margin levels; and is skilled to ensure each member of the decision team meets his/her objectives and measurement criteria.

In this example, prospecting expertise factor 336 includes two elements including: proficiency in mapping a full year prospect plan that is periodically updated (e.g., quarterly), and the activity and skill to create new prospects that generate enough orders to meet/exceed the account manager's revenue/margin and order budgets; and possesses the capability to maintain 100% of assigned prospect budgets on a month and year to date basis.

In this example, new business demand creation factor 337 includes a single element including: the capability of creating a minimum combination of new qualified prospects (e.g., 4 to 6) and maintain preexisting prospects, and the ability to maintain enough prospect revenue activity (e.g., qualified prospects (QP's), prospects (P's), opportunities (O's)) to achieve assigned business targets.

In this example, questioning techniques factor 338 includes three elements including: the capability to extract the appropriate information required to determine if the account manager has a viable prospect within the first or second call; the ability to elicit pertinent information throughout the sales cycle from all necessary levels/departments (e.g., manager, VP level, or higher) that will advance his/her solution as the most viable to your prospect; and skilled at acquiring effective credibility with every business contact on the first call.

In this example, objection handling adeptness factor 339 includes two elements including: ability to address identified issues and turn the identified issues into proactive actions that will continue the advancement of his/her opportunity within the sales cycle while minimizing the effectiveness of competitors; and skilled at being prepared to avoid objections by anticipating potential objections through the information he/she elicits throughout the sales cycle.

In this example, forecasting expertise factor 340 includes four elements including: the ability to predict by account, the product/solution and supporting information required to deliver a revenue/margin commitment (e.g., monthly and/or 90-day rolling); the control and depth of knowledge that an account manager's has of his/her forecasted prospects; proficiency in understanding the processes and the critical steps within each customer's buying cycle; and skilled to enable the manufacturing and procurement groups proficiency in reducing inventory levels which assist in the achievement of the company's financial plan and objectives.

In this example, closing proficiency factor 341 includes two elements including: competence to pre-determine and plan the close dates for his/her solutions (e.g., minimize client's buying cycle); and the ability to use presentations, trial closings and every sales call as vehicles to bring a customer to a point where the customer's needs and desires will lead to a purchase his/her solution (e.g., 65% for qualified prospects).

In this example, account strategy acumen factor 342 includes four elements including: competence to pre-determine the solution and revenue opportunities by account as well as the ability to access and manage up/down/across (e.g., two levels above initial contact) within an organization; skilled at orchestrating his/her company's resources to maximize his/her selling time and face to face calls with his/her prospects; proficient in producing a plan to win the business and maximize revenue/margin opportunities; and is effective at creating the path to build business and personal relations at various levels (3×3 principle—up/down/across) in a company that will mitigate the effect of competition.

In this example, territory/operation management factor 343 includes three elements including: the ability to assess, cultivate and manage the revenue potential in an account manager's assignment, which is a functional comprehension and ranking of the top five markets in his/her operation (e.g., transportation, logistics, manufacturing, healthcare, etc.); the ability to compare and dissect his/her periodic revenue/margin (e.g., 12 month) and business objective results per market served, and the capability to maximize revenue/margin potential regularly (e.g., monthly) in the his/her assignment as well as a succinct understanding of his/her current customers' business; and the ability to develop and execute a business plan that charts a course of action by industry, application, and productivity that will generate the highest possible margins and deliver planned results, and the skill to create and maintain the required prospects at designated budget levels.

In this example, account penetration factor 344 includes three elements including: the ability to use the 3×3 principal/method to build, develop and maintain business and selling relationships at various senior and executive levels and different functional areas within an account; the ability to generate the minimum (or more) number of contacts for penetration (e.g., nine strategic relationships); and the ability to include the appropriate amount of vertical and horizontal supporting contacts to implement the 3×3 principal/method.

In this example, trusted advisor factor 345 includes two elements including: possesses sufficient aptitude and skill to dominate and influence the decision making process relating to his/her solutions; and possesses the confidence and competence when involved in the planning portion of the customer buying cycle that allows identification of issues versus being a part of the customer's buying cycle that is engaged after the solution decision is made.

In this example, executive level calls factor 346 includes four elements including: possession of the talent, resourcefulness and skill to call at the executive level; comprehension of specific talk tracks that are used with each executive level he/she engages; possesses a thorough understanding of the political and business value that he/she can contribute to each prominent executive; and possesses a clear understanding of each executive measurement criteria.

In operation and described in FIG. 4 below, one or more supervisors assigns a value to one or more of the elements within the factors that are within the categories of hierarchical diagram 300. For example, a value of zero can mean that the individual has no proficiency in that performance characteristic, and a value of five could mean the individual has an expert proficiency level. In one embodiment, each individual within an organization can be rated on some, none, or all of the elements. The ratings can be limited to a particular category, to one or more particular factors within a particular category, or to one or more particular elements within a given factor that is within a given category. Results of the ratings can be used in raw form or, alternatively, can be averaged to smooth the values. Additionally, a summation of the values can be provided in whole, or in part, for an individual or a group of individuals for performance comparison. Alternatively, a group of individuals can be assessed to compare their specific performance of one particular element or they can be assessed as a group to gauge the group's performance regarding a specific element, or the group's performance regarding the elements within a specific factor or category.

Figure 4:
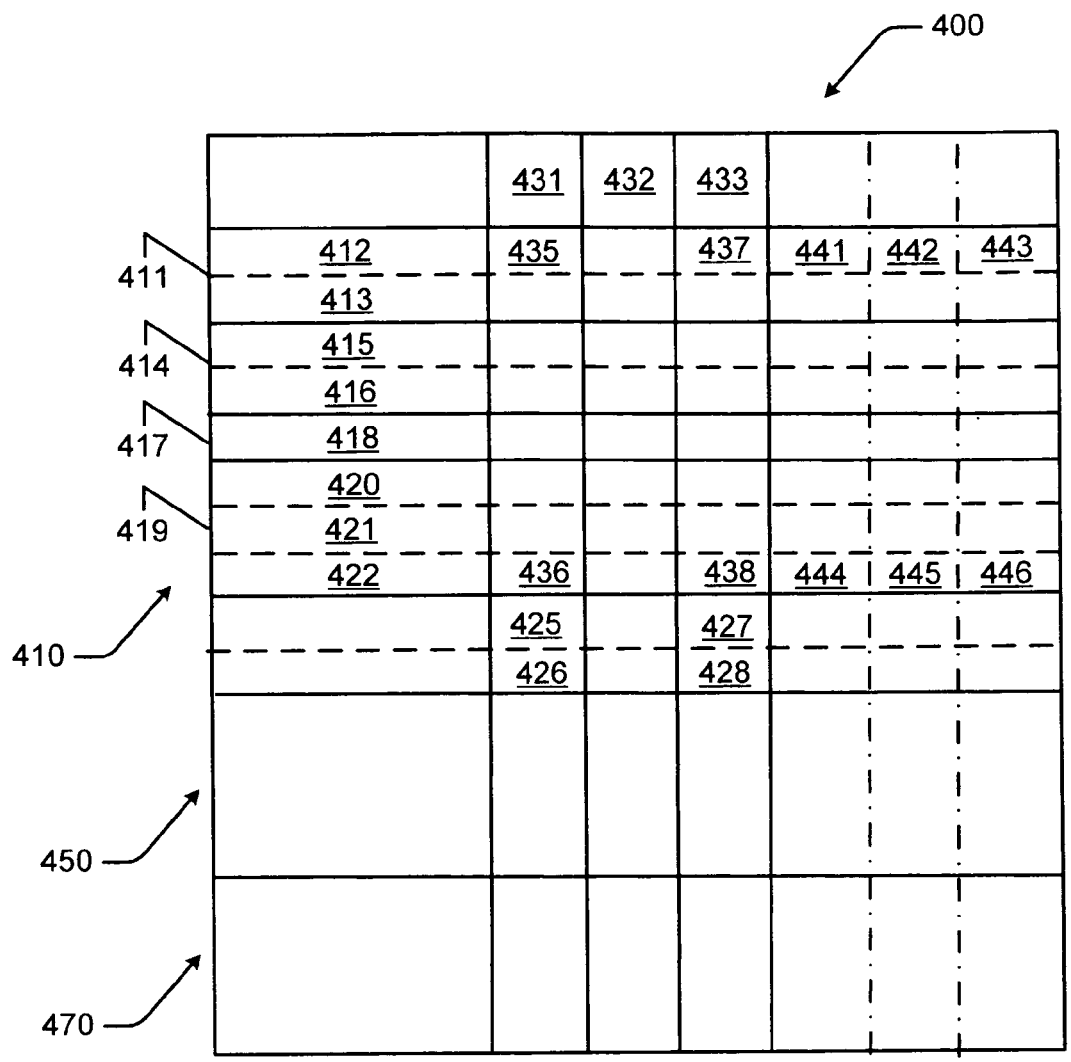
FIG. 4 is a diagram illustrating a graphical user interface (GUI) display of a table populated with rating information based on the hierarchical structure introduced above, in accordance with one embodiment of the present invention.

FIG. 4 is a diagram illustrating a graphical user interface (GUI) display 400 of a table populated with rating information based on the hierarchical structure introduced above, in accordance with one embodiment of the present invention. GUI display 400 is a table of data organized by category and rated individuals. GUI display 400 includes categories 410, 450, and 470 as well as individuals 431-433. GUI display 400 additionally includes factors within each category as well as elements within each factor. GUI display 400 additionally includes data points 435-436 and 437-438 that represent numerical values of rated individuals and correspond to a specific rated element. GUI display 400 further includes factor scoring values 425 and 427 as well as factor rating values 426 and 428 and raw element scores 441 and 444, element scoring values 442 and 445, and element rating values 443 and 446. For clarity, the majority of data points are not illustrated.

As described in FIG. 3 above, categories 410, 450, and 470 are data constructs that each describe a work related area having a hierarchy of sub-areas to be rated. Further, factors 411, 414, 417, and 419 are data constructs describing a work related sub-area associated with its parent category and further including a hierarchy of sub-areas (e.g., elements) to be rated. Additionally, each of the elements 412-413, 415-416, 418, and 420-422 is a data point describing a specific work related task to be rated. In FIG. 4, data points 435-436 and 437-438 include a value for an element.

When GUI display 400 is populated with values for each data point, a summation of the column beneath an individual's identity will result in a factor score value as well as a factor rating value for the individual. In an example, a summation of the column beneath individual 431 and defined as including all the data points from data point 435—data point 436 (inclusive) results in a factor score value 425 as well as a factor rating value 426 (described in FIG. 6, below) for individual 431. Likewise, a summation of the column beneath individual 433 and defined as including all the data points from data point 437—data point 438 (inclusive) will result in a factor score value 427 as well as a factor rating value 428 (described in FIG. 6, below) for individual 431. The vertical summation of all of the data points for the elements associated with a factor or category will provide an individual's numerical performance value that can be compared to other individuals for performance comparisons. In an example, the total value of the data points from data point 437—data point 438 inclusively is the factor score value 427 and the factor rating value 428 is obtained by dividing the factor score value 427 by the number of factors in category 410.

A summation of the row associated with element 412 and defined as including all the data points from data point 435—data point 437 (inclusive) results in a raw element score 441, an element score value 442 as well as an element rating value 443 (described in FIG. 6, below) for the group of individuals as a whole. Similarly, a summation of the row associated with element 412 and defined as including all the data points from data point 436—data point 438 (inclusive) results in a raw element score 444, an element score value 445 as well as an element rating value 446 (described in FIG. 6, below) for the group of individuals as a whole.

The horizontal summation of all of the data points associated with a particular element will provide a group's numerical performance value of that element that can be compared to other specific elements or the same element associated with another group for performance comparisons. In an example, the total value of the data points from data point 435—data point 437 inclusively is the raw element score 441 and the element score value 442 or average element score value is obtained by dividing the raw element score 441 by the number of individuals 431-433 tracked within GUI display 400. The element rating value 443 is obtained by multiplying the element score value 442 by a weighting value. To obtain a factor score (not shown), element rating value 443 is added to raw element score 441.

Figure 5:
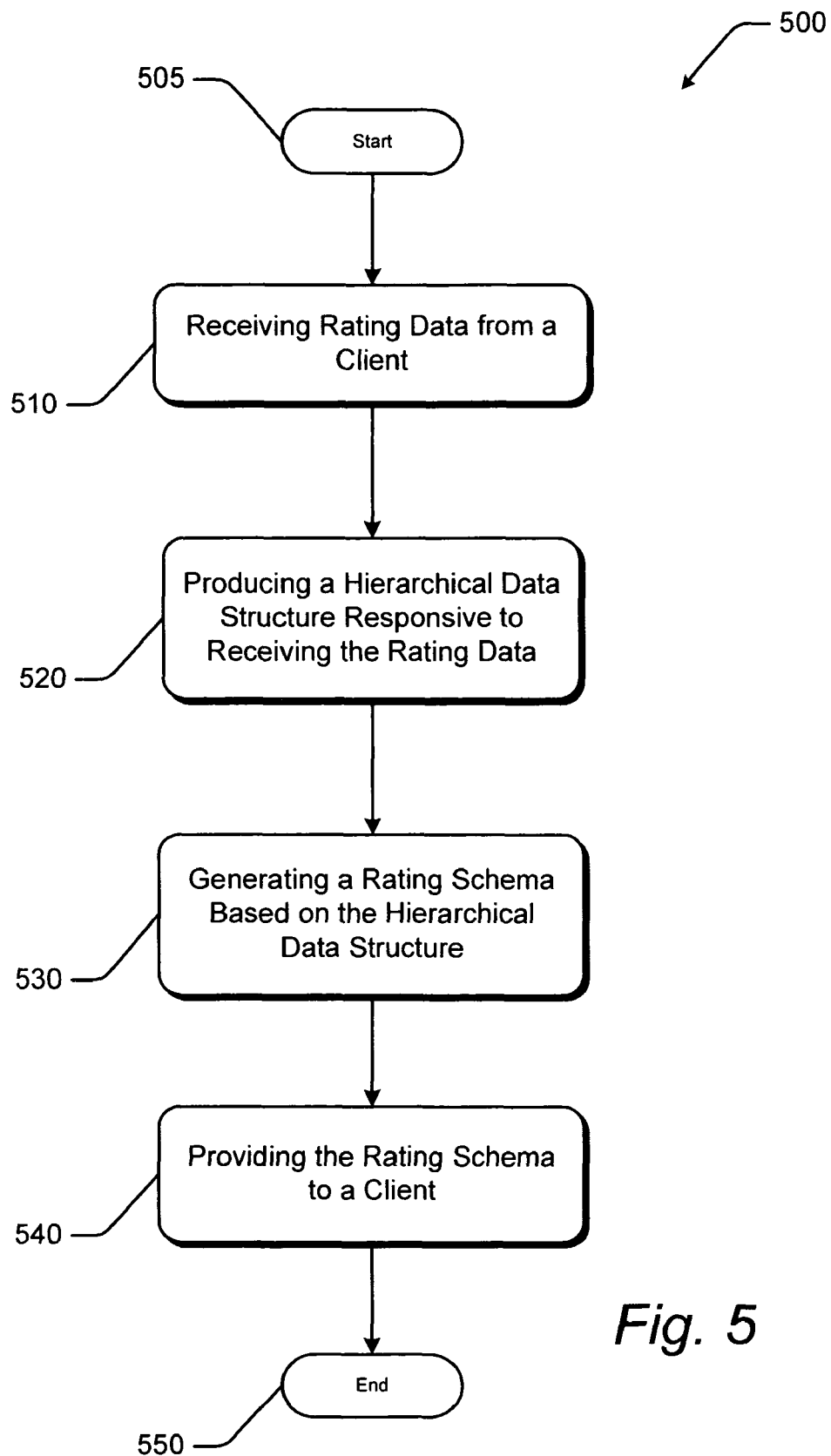
FIG. 5 is an operational flow diagram generally illustrating a process for determining performance proficiency within an organization.

FIG. 5 is an operational flow diagram generally illustrating a method 500 for determining performance proficiency within an organization. In one embodiment, method 500 is implemented with components of the exemplary operating environments of FIGS. 1 and 2 as well as elements of the hierarchical diagram and GUI display of FIGS. 3 and 4. In certain embodiments, one or more steps of method 500 are embodied in a computer-readable medium containing computer-readable code such that a series of steps are implemented when the computer-readable code is executed on a computing device. In other embodiments, one or more steps are performed manually. In some implementations, certain steps of method 500 are combined, performed simultaneously or in a different order, without deviating from the objective of method 500.

In FIG. 5, method 500 begins at block 505. At block 510, rating data is received from a client. The rating data is a collection of one or more data points describing one or more individuals with respect to predefined criteria. In one embodiment, rating data is received at a service provider from a client, such as from a client computer, a client computer, or via direct input into the service provider by the client. In an example and referring to FIG. 1 above, rating data is received at evaluation application 135 via data retriever 136, such as via a component in communication with I/O module 150. In another embodiment, rating data is received at a service provider from a client, such as from a client computer or a client computer via the internet. In an example and referring to FIG. 2 above, rating data is received at a service provider 220 from a client, such as from a client computer 240 or a remote server 230 via the internet 210. In another example and referring to FIG. 1, rating data is received at evaluation application 135 via data retriever 136 and web access 138, such as via the internet. In still another example, the rating data is received by an individual from another individual.

In one embodiment, each data point that describes an individual with respect to specific predefined criteria is associated with an associated element. In an example and referring to FIGS. 3 and 4 above, there are 63 elements that are each defined by a data point describing (e.g., rating) an individual with respect to the associated element (e.g., predefined criteria). Referring to FIG. 4 above, data points 435-438 are each data points describing (e.g., rating) an individual 431 and 433 with respect to a specific element (e.g., predefined criteria), such as elements 412 and 422.

At block 520, a hierarchical data structure is produced responsive to receiving the rating data. The hierarchical data structure is a data construct including data associated with a specific predefined criteria fields that are organized into one or more sub-areas that are, in turn, organized into one or more areas. In one embodiment, the rating data is associated with specific predefined criteria fields called elements that are organized into one or more groupings of factors that are organized into one or more groupings of categories.

In an example and referring to FIGS. 3 and 4 above, the rating data is organized into 63 elements that are, in turn, organized into 27 groupings of factors that are, in turn, organized into a job proficiency category, a job performance category, and a job effectiveness category. Continuing the example, the rating data associated with elements 412 and 413 is organized into factor 411, the rating data associated with elements 415 and 416 is organized into factor 414, the rating data associated with element 418 is organized into factor 417, and the rating data associated with elements 420-422 is organized into factor 419. The factors 411, 414, 417, and 419 are organized into category 410.

At block 530, a rating schema is generated based on the hierarchical data structure. In one embodiment, processing the data (described in FIG. 6, below) allows for an accurate comparison of individuals upon which the rating data is based. In an example, the rating schema may be generated to give a client of the method an overall rating of an individual as pertaining to a specific rating element, factor, or category. In another example, the rating schema may be generated to give a client of the method an overall rating of a group of individuals as pertaining to a specific rating of an element, a factor, or a category. In yet another example, the rating schema may be generated to give a client of the method an overall weighted/averaged rating of either of the aforementioned examples. In another example and referring to FIG. 6 below, a group of individuals (e.g., a team) can be assigned a performance IQ rating based on the generated rating schema. In any of the above examples, method 500 may branch to block 605 of method 600 of FIG. 6 to generate the rating schema.

At block 540, the rating schema is provided to a client. In one embodiment, the rating schema is provided to a client (e.g., a person, a client computer, etc.) from a service provider. In an example and referring to FIG. 1 above, the rating schema is provided to I/O module 150 from evaluator 137. In another embodiment, the rating schema is provided to a client from a service provider via the internet. In an example and referring to FIG. 2 above, the rating schema is provided to a client computer 240 or a remote server 230 from a service provider 220 via the internet 210.

At block 550, the method ends.

Figure 6:
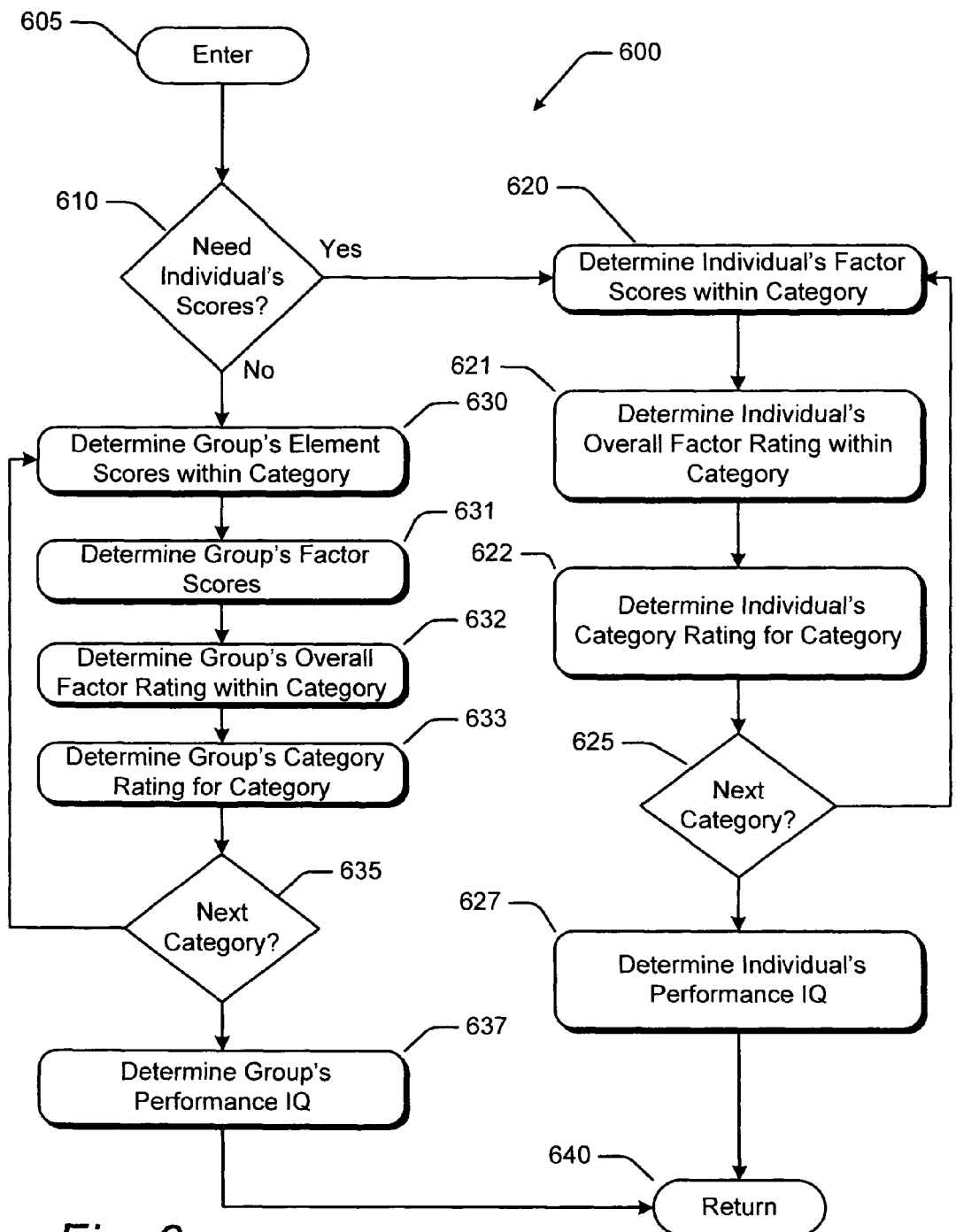
FIG. 6 is an operational flow diagram generally illustrating a process for generating a rating schema based on a hierarchical data structure.

FIG. 6 is an operational flow diagram generally illustrating a method 600 for implementing block 540 of FIG. 5 that includes generating a rating schema based on a hierarchical data structure. In one embodiment, method 600 is implemented with components of the exemplary operating environments of FIGS. 1 and 2 as well as elements of the hierarchical diagram and GUI display of FIGS. 3 and 4. In some implementations, certain steps of method 600 are combined, performed simultaneously or in a different order, without deviating from the spirit of method 600.

In FIG. 6, method 600 enters at block 605. In one embodiment, block 605 is entered from block 530 of FIG. 5. At decision block 610, it is determined whether an individual's scores are requested. If an individual's scores are requested, then the method 600 advances to block 620. If a group's scores are requested, then the method 600 advances to block 630.

At block 620, the individual's factor scores within a category are determined. The factor scores are determined by a summation of the data points associated with each of the rated elements within each factor. In an example and referring to FIG. 4 above, a summation of the vertical data points (e.g., data point 435 as well as other data points (not shown) associated with individual 431) associated with each of the rated elements within each factor (e.g., factor 411). In another example, each of the data points associated with each of the rated elements within each factor are summed separately for each factor. The resultant summation for each factor is termed a factor score.

At block 621, a factor rating is determined for the individual. The factor rating is determined by generating an average of all of the factor scores. In an example and referring to FIG. 4 above, after a summation of the data points associated with each of the rated elements within each factor is completed, the total is divided by the number of data points utilized. In another example, the factor scores determined in block 621 are summed with the result divided by the number of data points utilized in block 621.

At block 622, the individual's overall factor rating for the category is determined. The individual's overall factor rating is determined by multiplying the factor rating determined in block 621 by a category weight value. In one embodiment, the category weight value is a client provided value.

At decision block 625, it is determined whether there is another category with data points to process. If there is another category with data points to process, method 600 returns to block 620. If there is not another category with data points to process, method 600 advances to block 627.

At block 627, the Individual's Performance IQ is determined. The Performance IQ is generated as a summation of the category ratings associated with the individual. After method 600 determines the Individual's Performance IQ, method 600 advances to block 640.

At block 630, the group's element scores within each factor are determined. The element scores are determined by a summation of the data points associated with each of the rated individuals for each element. In an example and referring to FIG. 4 above, a summation of the horizontal data points (e.g., data points 435 and 437 as well as other data points (not shown) associated with element 412) associated with each of the rated individuals (e.g., individuals 431-433) of each element (e.g., element 412).

At block 631, a factor scores are determined for each factor for the group. Each factor score is determined by generating an average of all of the element scores for each factor for the group. In an example and referring to FIG. 4 above, after the element scores within each factor are determined (e.g., in block 630), each of the element scores are then averaged by dividing the sum by the number of individuals being rated in the group to determine element rating. Each element rating is then multiplied by an associated factor weight value and the results of the multiplications are then summed to determine a factor score for each factor. In one embodiment, the associated factor weight value is client provided value that is a constant value for each element. In another embodiment, the associated factor weight value is client provided value that is a different value for some of the elements.

At block 632, the group's overall factor rating is determined. The group's overall factor rating is determined by summing all of the factor scores for the group and then dividing the total by the number of factors within the category. At block 633, the group's category rating is determined. The group's category rating is determined by multiplying the group's overall factor rating determined in block 632 by a category weight value. In one embodiment, the category weight value is a client provided value.

At decision block 635, it is determined whether there is another category with data points to process. If there is another category with data points to process, method 600 returns to block 630. If there is not another category with data points to process, method 600 advances to block 637.

At block 637, the Individual's Performance IQ is determined. The Performance IQ is generated as a summation of the category ratings associated with the individual. After method 600 determines the Individual's Performance IQ, method 600 advances to block 640.

At block 640, method 600 returns to block 530 of FIG. 5.

While the present invention has been described with reference to particular embodiments and implementations, it should be understood that these are illustrative only, and that the scope of the invention is not limited to these embodiments. Many variations, modifications, additions and improvements to the embodiments described above are possible. It is contemplated that these variations, modifications, additions and improvements fall within the scope of the invention as detailed within the following claims.

I claim:

1. A method, performed by executing computer-executable instructions using a computer, for determining a performance effectiveness rating, the method comprising:
 a) subjectively evaluating a plurality of subjects in an organization, the plurality of subjects being direct reports to a rater in the organization, wherein none of the plurality of subjects are peers or supervisors of the rater who is subjectively evaluating the subjects;

b) objectively assigning rating data to each of the plurality of subjects in a manner that transforms the subjective evaluation of the subjects into an objective measurement of the subjects, the objective measurement being based on a structured data set that includes a plurality of performance categories, each performance category including a plurality of factors, each factor including a plurality of elements, each element defining a specific work related task associated with the factor, the specific work related task being defined based on objectives of the organization, the rating data includes a value assigned to each relevant element in each factor in each performance category for each of the plurality of subjects, the value being within a range of values defined for the specific work related task associated with the element, the value being based on criteria specified for the specific work related task and being a number; and c) generating a performance effectiveness rating based on the rating data assigned to the structured data set, the performance effectiveness rating measures a subject's capability to perform an associated job assignment, wherein the performance effectiveness rating includes an individual factor scoring value and an individual factor rating value for each of at least a portion of the subjects, the individual factor scoring value being determined by summing each value for each relevant element in each factor for one of the plurality of categories for one of the subjects, the individual factor rating value being determined by dividing the individual factor scoring value of the one subject by a number of relevant factors for the one subject, wherein the relevant element refers to an element in which the job assignment for the one subject includes performing the specific work related task associated with the element and wherein the relevant factor refers to a factor having at least one relevant element associated with the one subject wherein generating a performance effectiveness rating further comprises:

for each factor, adding the individual factor score for each of the subjects on a team to determine a total team factor score;

for each factor, dividing the total team factor score by the total number of subjects on the team to produce an average team factor score; and for each category, multiplying the average total team factor score by a category weight value to determine a team category score.

2. The method of claim 1, further comprising providing the performance effectiveness rating to a client.

3. The method of claim 1, wherein generating a performance effectiveness rating further comprises:
   determining an average individual factor rating for a category; and
   multiplying the average individual factor rating by a category weight value to determine an individual category score for each category associated with the subject.

4. The method of claim 3, wherein the category weight value is a client provided value.

5. The method of claim 3, further comprising summing the individual category score for each category for the subject to determine the performance effectiveness rating for the subject.

6. The method of claim 3, wherein each element comprises a weighted element.

7. The method of claim 6, wherein each weighted element is based on a performance impact that the element has within the associated factor.

8. The method of claim 7, wherein the performance effectiveness rating for a plurality of raters is aggregated and provided to upper management for measuring multiple teams and the individual subjects associated with each team within the organization, wherein each team is associated with one of the raters.

9. The method of claim 1, wherein the weighting values are client provided values.

10. The method of claim 1, further comprising: summing the team category score for each category to determine the team performance effectiveness rating for the team.

11. The method of claim 1, wherein each factor comprises a weighted factor.

12. The method of claim 1, wherein transforming the subjective evaluation of the subjects into an objective measurement of the subjects assigns the rating data for each relevant element using a ranking mechanism of the subjects.

13. The method of claim 12, wherein the ranking mechanism assigns a top value within the range of values to the subject who best performs the specific work related task associated with the element and iteratively assigns another value, which is lower than the previously assigned value, to the subject who is next best at performing the specific work related task associated with the element, until each of the subjects has been ranked and assigned rating data for the relevant element.

14. The method of claim 12, wherein the number for the value comprises a decimal number on a quarter point scale.

* * * * *